US009239726B2

(12) United States Patent
Li et al.

(10) Patent No.: US 9,239,726 B2
(45) Date of Patent: Jan. 19, 2016

(54) MISOPERATION-PREVENTING METHOD AND DEVICE

(71) Applicant: Beijing Xiaomi Technology Co., Ltd., Beijing (CN)

(72) Inventors: Shen Li, Beijing (CN); Wenlin Wang, Beijing (CN); Weixing Li, Beijing (CN)

(73) Assignee: Beijing Xiaomi Technology Co., Ltd., Beijing (CN)

( * ) Notice: Subject to any disclaimer, the term of this patent is extended or adjusted under 35 U.S.C. 154(b) by 0 days.

(21) Appl. No.: 13/959,060

(22) Filed: Aug. 5, 2013

(65) Prior Publication Data
US 2014/0068243 A1    Mar. 6, 2014

(30) Foreign Application Priority Data

Aug. 30, 2012  (CN) .......................... 2012 1 0316613

(51) Int. Cl.
*H04M 1/00* (2006.01)
*G06F 9/44* (2006.01)
*G06F 3/00* (2006.01)
*G06F 3/041* (2006.01)
*H04M 1/725* (2006.01)
*G06F 3/0488* (2013.01)

(52) U.S. Cl.
CPC ............... *G06F 9/4421* (2013.01); *G06F 3/00* (2013.01); *G06F 3/0418* (2013.01); *H04M 1/72569* (2013.01); *G06F 3/0488* (2013.01); *H04M 2250/12* (2013.01); *H04M 2250/22* (2013.01)

(58) Field of Classification Search
CPC .............. H04M 1/72569; H04M 1/72563; H04M 1/72519; H04M 1/72583; H04M 1/72597; H04M 1/667; H04M 1/677

USPC ............................................... 455/566, 550.1
See application file for complete search history.

(56) References Cited

U.S. PATENT DOCUMENTS

| 7,006,793 | B2* | 2/2006 | Himmel et al. ............... 455/41.1 |
| 7,479,949 | B2* | 1/2009 | Jobs et al. ...................... 345/173 |
| 8,195,220 | B2* | 6/2012 | Kim et al. ................... 455/550.1 |
| 2004/0233153 | A1 | 11/2004 | Robinson |
| 2007/0085157 | A1 | 4/2007 | Fadell et al. |
| 2010/0090854 | A1 | 4/2010 | Yin |

(Continued)

FOREIGN PATENT DOCUMENTS

| CN | 101951444 | 1/2011 |
| CN | 101951444 (A) | 1/2011 |

(Continued)

OTHER PUBLICATIONS

European Search Report of Application No. 13833229.1, from the European Patent Office, mailed Jun. 10, 2015.

(Continued)

*Primary Examiner* — Temica M Beamer
(74) *Attorney, Agent, or Firm* — Finnegan, Henderson, Farabow, Garrett & Dunner LLP

(57) ABSTRACT

A misoperation-preventing method for use in a mobile terminal having a touch screen, includes: monitoring a distance between the mobile terminal and an object in a surrounding environment, after the mobile terminal transitions from a standby state to an active state; determining if the distance satisfies a preset distance condition; and disabling the touch screen if it is determined that the distance satisfies the preset distance condition.

12 Claims, 7 Drawing Sheets

(56) References Cited

U.S. PATENT DOCUMENTS

| | | |
|---|---|---|
| 2011/0256848 A1 | 10/2011 | Bok et al. |
| 2012/0071149 A1* | 3/2012 | Bandyopadhyay et al. .. 455/418 |
| 2013/0157726 A1 | 6/2013 | Miyazaki et al. |

FOREIGN PATENT DOCUMENTS

| | | |
|---|---|---|
| CN | 102841684 | 12/2012 |
| JP | 2012049688 (A) | 3/2012 |
| KR | 20090100319 (A) | 9/2009 |
| WO | WO 2012/026125 A1 | 3/2012 |
| WS | WO 2009/096643 A1 | 8/2009 |

OTHER PUBLICATIONS

Office Action for Korean Application No. 10-2014-7035356, from the Korean Intellectual Property Office, dated Sep. 25, 2015.

* cited by examiner

302

MISOPERATION-PREVENTING METHOD AND DEVICE

RELATED APPLICATIONS

This application is based upon and claims the benefit of priority from Chinese Patent Application No. CN201210316613.7, filed Aug. 30, 2012, the entire contents of which are incorporated herein by reference.

TECHNICAL FIELD

This disclosure generally relates to a misoperation-preventing method and device.

BACKGROUND

Along with the rapid development of touch technology, mobile terminals with touch screens, such as cell phones and tablet computers, are extensively used. A user can accomplish the control of a mobile terminal through a touch screen, and the mobile terminal generally provides the user with diversified and personalized interaction.

Because operation of the mobile terminal can be accomplished through simple touch actions, misoperation can occur very easily for the mobile terminal with the touch screen. For example, the user may put the mobile terminal in a pocket or handbag to carry it. When the user moves, a power key of the mobile terminal may be triggered by mistake, causing the touch screen of the mobile terminal to be activated and accept touch events, possibly resulting in unexpected misoperation and loss to the user.

Conventional mobile terminals typically support configuration of screen-locking. The user generally needs to release a screen-locking status of a conventional mobile terminal with a preset unlocking method, to use the mobile terminal normally.

Although screen-locking can reduce the misoperation risk to a certain extent, when the mobile terminal transitions from a standby state to an active state, the misoperation-preventing purpose may not be achieved. For example, when the mobile terminal that is in the standby state receives an incoming call or an alarm, the mobile terminal transitions into the active state. To facilitate the user's timely reaction, the mobile terminal conventionally releases the screen-locking status and displays the incoming call or the alarm. As a result, the misoperation-preventing purpose through screen-locking may not be achieved.

SUMMARY

According to a first aspect of the present disclosure, there is provided a misoperation-preventing method for use in a mobile terminal having a touch screen, comprising: monitoring a distance between the mobile terminal and an object in a surrounding environment, after the mobile terminal transitions from a standby state to an active state; determining if the distance satisfies a preset distance condition; and disabling the touch screen if it is determined that the distance satisfies the preset distance condition.

According to a second aspect of the present disclosure, there is provided a non-transitory medium including instructions, executable by a processor in a mobile terminal, for performing a misoperation-preventing method, the method comprising: monitoring a distance between the mobile terminal and an object in a surrounding environment, after the mobile terminal transitions from a standby state to an active state; determining if the distance satisfies a preset distance condition; and disabling the touch screen if it is determined that the distance satisfies the preset distance condition.

According to a third aspect of the present disclosure, there is provided a mobile terminal, comprising: a processor; and a touch screen coupled to the processor; wherein the processor is configured to: monitor a distance between the mobile terminal and an object in a surrounding environment, after the mobile terminal transitions from a standby state to an active state; determine if the distance satisfies a preset distance condition; and disable the touch screen if the processor determines that the distance satisfies the preset distance condition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
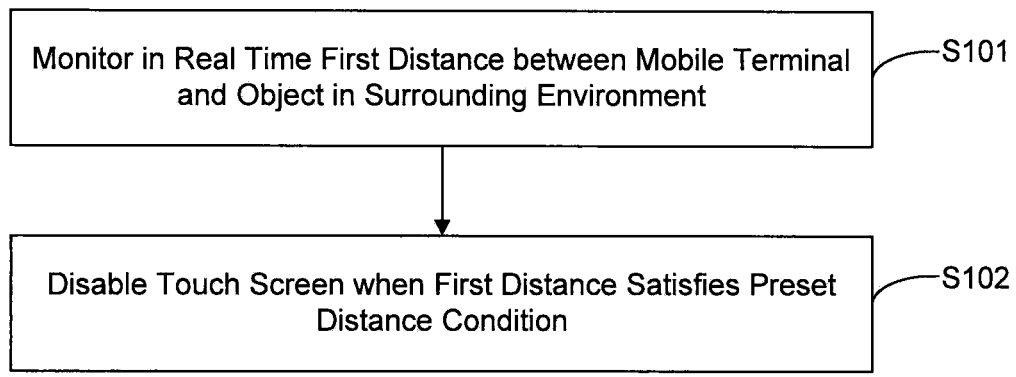
FIG. 1 illustrates a flowchart of a misoperation-preventing method for use in a mobile terminal having a touch screen, according to an exemplary embodiment.

FIG. 1 illustrates a flowchart of a misoperation-preventing method 100 for use in a mobile terminal having a touch screen, according to an exemplary embodiment. For example, the mobile terminal may be a cellphone, a tablet computer, an MP4 device, etc. The mobile terminal uses the method 100 to prevent a misoperation after the mobile terminal transitions from a standby state to an active state. The method 100 includes the following steps. For example, when the mobile terminal is not actively used by a user, the mobile terminal may be in the standby state. When the mobile terminal that is in the standby state receives, e.g., an incoming call or an alarm, the mobile terminal transitions into the active state for receiving the user's response.

Referring to FIG. 1, in step S101, the mobile terminal monitors in real time a first distance between the mobile terminal and an object in its surrounding environment, after the mobile terminal transitions from the standby state to the active state. Specifically, the mobile terminal monitors the first distance between the touch screen of the mobile terminal and a nearest object in front of the touch screen.

In step S102, the mobile terminal determines that the first distance satisfies a preset distance condition and, in response to the determination, disables the touch screen. For example, the preset distance condition may be that the first distance is smaller than, or equal to, a preset distance threshold. After the mobile terminal determines that the first distance satisfies the preset distance condition, the mobile terminal transitions into a screen-off state preset by the operating system of the mobile terminal. In addition, the cause for transitioning into the screen-off state is reported to the operating system, so that the operating system can judge, on the basis of the cause for transitioning into the screen-off state, whether to implement any subsequent control command given by the user not through the touch screen.

In exemplary embodiments, if the mobile terminal determines that the first distance does not satisfy the preset distance condition, the mobile terminal enables the touch screen. After the enabling of the touch screen, the mobile terminal determines whether the first distance continues to not satisfy the preset distance condition for a preset first time period. If the mobile terminal determines that the first distance continues to not satisfy the preset distance condition for the preset first time period, the mobile terminal stops monitoring in real time the first distance between the mobile terminal and the object in surrounding environment. Otherwise, the mobile terminal disables the touch screen.

In the illustrated embodiment, the misoperation-preventing method 100 determines whether the mobile terminal is put away, e.g., placed in a handbag or a pocket, by the user, through the real-time monitoring of the first distance between the mobile terminal and the object in surrounding environment after the mobile terminal transitions from the standby state into the active state. When the mobile terminal determines that the first distance satisfies the preset distance condition, which can be considered that the mobile terminal is in the status of being put away by the user, the mobile terminal disables the touch screen to prevent any misoperation of the mobile terminal and to avoid loss that may be caused by the misoperation.

Figure 2:
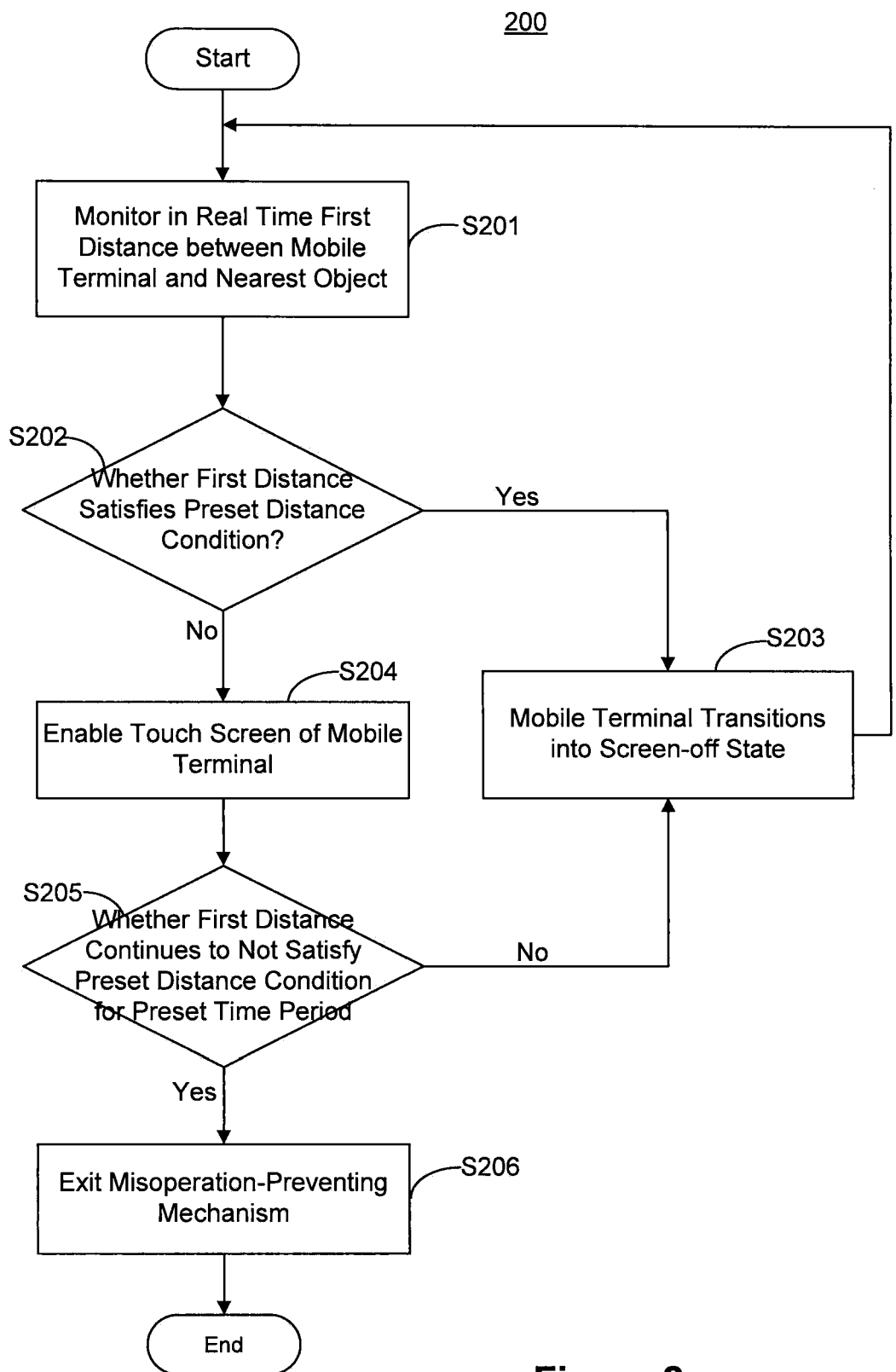
FIG. 2 illustrates a flowchart of a misoperation-preventing method for use in a mobile terminal, according to an exemplary embodiment.

FIG. 2 illustrates a flowchart of a misoperation-preventing method 200 for use in the mobile terminal, according to an exemplary embodiment. The method 200 may be integrated into the operating system of the mobile terminal, or be installed in the mobile terminal as an application. The mobile terminal uses the method 200 to prevent a misoperation after the mobile terminal transitions from the standby state to the active state. The method 200 includes the following steps.

Referring to FIG. 2, in step S201, the mobile terminal monitors in real time a first distance between the mobile terminal and a nearest object to the touch screen of the mobile terminal. For example, the mobile terminal may include an infrared distance sensor to obtain the first distance through distance measurement. The operating system of the mobile terminal may use a software interface corresponding to the infrared distance sensor to obtain the first distance. Because the infrared distance sensor is normally installed on the same side as the touch screen of the mobile terminal, the nearest object to the touch screen of the mobile terminal is generally an object in front of the touch screen of the mobile terminal.

In step S202, the mobile terminal determines whether the first distance satisfies a preset distance condition. If yes, step S203 is performed; and if not, step S204 is performed. For example, the preset distance condition may be that the first distance is smaller than, or equal to, a preset distance threshold, such as 5 cm. The method 200 considers that the mobile terminal is put away, e.g., put in a handbag or a pocket, by the user when the first distance satisfies the preset distance condition. In this situation, the touch screen of the mobile terminal would not be expected to receive a control command from the user. When the first distance does not satisfy the preset distance condition, it is considered that the mobile terminal is taken out of the handbag or the pocket by the user for use. Accordingly, in this latter situation, the touch screen of the mobile terminal can receive a control command from the user.

If the mobile terminal determines that the first distance satisfies the preset distance condition, in step S203, the mobile terminal transitions into the screen-off state preset by the operating system of the mobile terminal, and step S201 is repeated. Specifically, the operating system may configure the mobile terminal with the screen-off state, and define statuses of hardware components of the mobile terminal after the mobile terminal transition into the screen-off state and responses of the hardware components to a control command inputted by the user. The mobile terminal may transitions into the screen-off state through a software interface provided by the operating system. When the mobile terminal transitions into the screen-off state, the touch screen is disabled.

Further, there may be different causes for the mobile terminal to transition into the screen-off state. For each of the different causes, the mobile terminal may have a different operable status, which is preset. For example, when the mobile terminal transitions into the screen-off state due to a screen-locking operation, the touch screen of the mobile terminal is disabled and, hence, cannot receive a control command given by the user through the touch screen, but the mobile terminal can receive and implement an operation command given by the user through wire control. When the mobile terminal transitions into the screen-off state preset by the operating system, the cause for the transition is also reported to the operating system.

If the mobile terminal determines that the first distance does not satisfy the preset distance condition, in step S204, the mobile terminal enables the touch screen. For example, the mobile terminal activates the touch screen such that the mobile terminal can receive and implement a control command given by the user through the touch screen.

In step S205, the mobile terminal determines whether the first distance continues to not satisfy the preset distance condition for a preset time period. If yes, step S206 is performed; and if not, step S203 is performed. For example, the time period may be preset as 1 second. The operation of step S205 may avoid misjudgment by the mobile terminal that the mobile terminal is taken out of, e.g., the handbag or pocket, by the user when in fact the mobile terminal has a large position change in the handbag or pocket due to, e.g., strenuous movement of the user.

In step S206, the mobile terminal exits the misoperation-preventing mechanism. Specifically, the mobile terminal stops monitoring in real time the first distance between the mobile terminal and the nearest object to the touch screen of the mobile terminal.

Further, the mobile terminal may exit the misoperation-preventing mechanism after the mobile terminal transitions into the standby state, e.g., when no operation of the user is received within a time period, the incoming call is hung up by the calling party, or an alarm stops.

In the illustrated embodiment, the misoperation-preventing method 200 judges whether the mobile terminal is put away, e.g., placed in a handbag or a pocket, by the user through real-time monitoring the first distance between the mobile terminal and the nearest object in front of the touch screen of the mobile terminal after the mobile terminal transitions from the standby state to the active state. When the first distance satisfies the preset distance condition, it can be considered that the mobile terminal is put away by the user and the touch screen of the mobile terminal should not receive a command from the user. The mobile terminal disables the touch screen to prevent misoperation and to avoid loss that may be caused by the misoperation.

Figure 3:
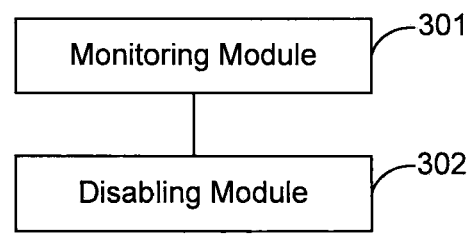
FIG. 3 illustrates a block diagram of a misoperation-preventing apparatus for use in a mobile terminal, according to an exemplary embodiment.

FIG. 3 illustrates a block diagram of a misoperation-preventing apparatus 300 for use in the mobile terminal, according to an exemplary embodiment. Referring to FIG. 3, the apparatus 300 includes a monitoring module 301 and a disabling module 302.

In exemplary embodiments, the monitoring module 301 is configured to monitor in real time a first distance between the mobile terminal and an object in surrounding environment, when the mobile terminal transitions from the standby state to the active state. For example, the monitoring module 301 is configured to monitor in real time the first distance between the touch screen of the mobile terminal and a nearest object in front of the touch screen. The disabling module 302 is configured to disable the touch screen when the monitoring module 301 monitors that the first distance satisfies a preset distance condition, as illustrated above with respect to the methods 100 (FIG. 1) and 200 (FIG. 2).

Figure 4:
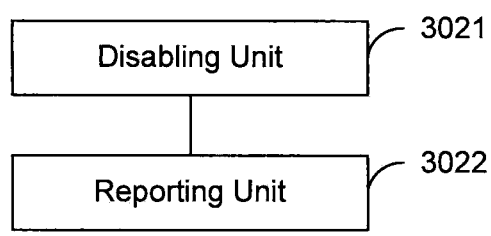
FIG. 4 illustrates a block diagram of a disabling module, according to an exemplary embodiment.

FIG. 4 illustrates a block diagram of the disabling module 302 (FIG. 3), according to an exemplary embodiment. Referring to FIGS. 3 and 4, the disabling module 302 includes a disabling unit 3021 and a reporting unit 3022.

In exemplary embodiments, the disabling unit 3021 is configured to cause the mobile terminal to transition into the screen-off state preset by the operating system of the mobile terminal when the monitoring module 301 monitors that the first distance satisfies the preset distance condition. The reporting unit 3022 is configured to report to the operating system the cause for transitioning into the screen-off state, so that the operating system can judge, on the basis of the cause for transitioning into the screen-off state, whether to implement a control command given by the user not through the touch screen.

Figure 5:
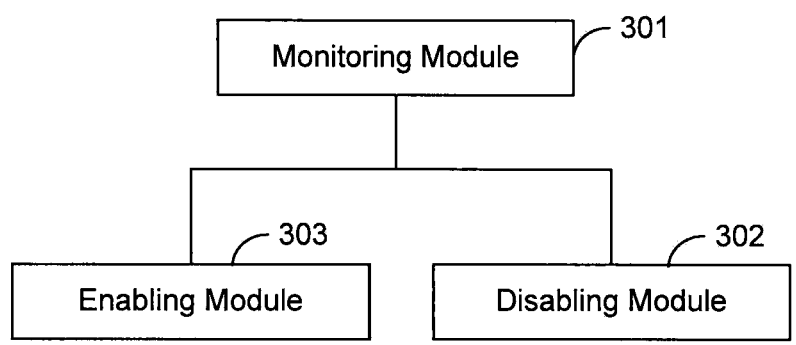
FIG. 5 illustrates a block diagram of a misoperation-preventing apparatus for use in a mobile terminal, according to an exemplary embodiment.

In exemplary embodiments, in addition to the monitoring module 301 and the disabling module 302 (FIG. 3), the apparatus 300 may further include an enabling module 303, as shown in FIG. 5. The enabling module 303 is configured to enable the touch screen of the mobile terminal when the monitoring module 301 monitors that the first distance does not satisfy the preset distance condition.

Figure 6:
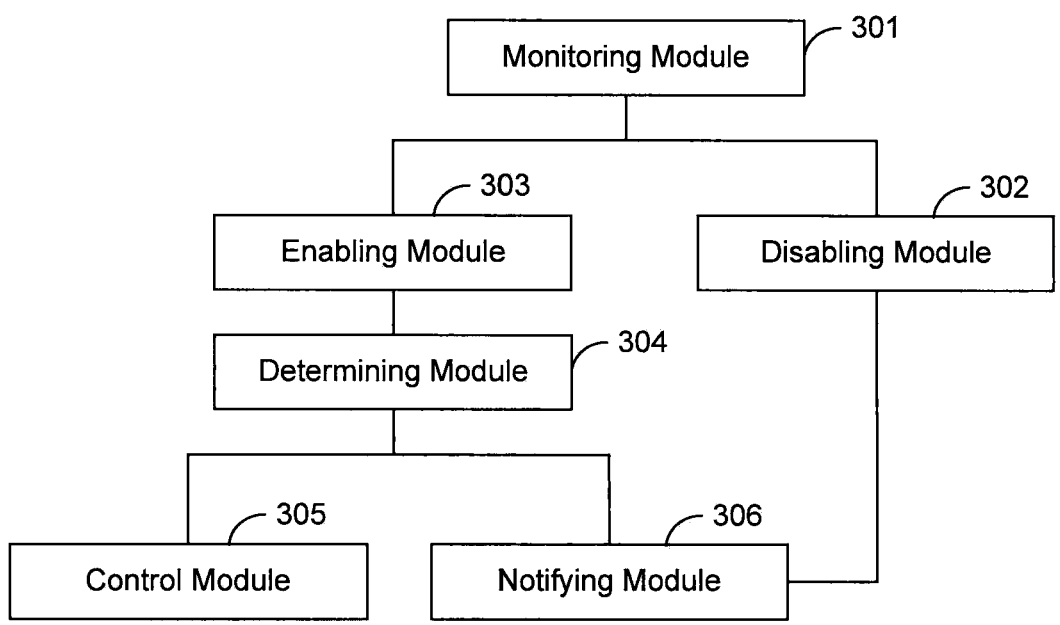
FIG. 6 illustrates a block diagram of a misoperation-preventing apparatus for use in a mobile terminal, according to an exemplary embodiment.

In exemplary embodiments, the apparatus 300 may additionally include a determining module 304, a control module 305, and a notifying module 306, as shown in FIG. 6. The determining module 304 is configured to determine whether the first distance continues to not satisfy the preset distance condition for a preset time period after the enabling module 303 enables the touch screen of the mobile terminal. The control module 305 is configured to stop the real-time monitoring of the first distance between the mobile terminal and the object in the surrounding environment when the determining module 304 determines that the first distance continues to not satisfy the preset distance condition for the preset time period. The notifying module 306 is configured to notify the disabling module 302 to disable the touch screen when the determining module 304 determines that the first distance becomes to satisfy the preset distance condition before the end of the preset time period.

Figure 7:
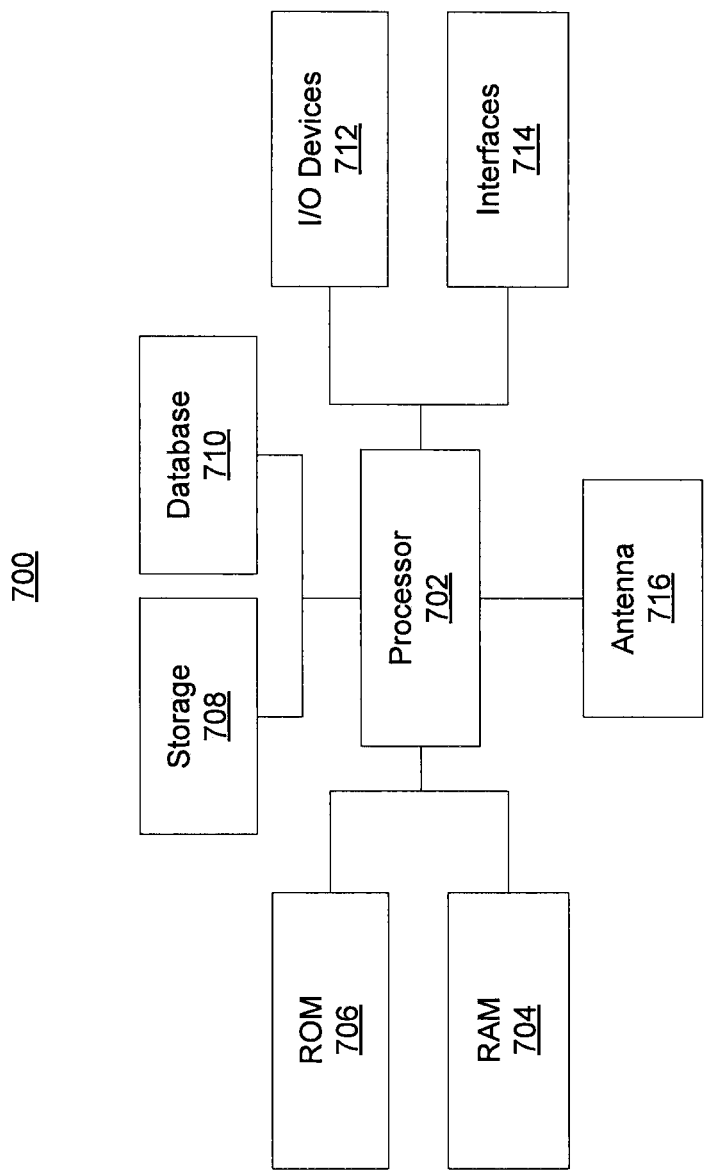
FIG. 7 illustrates a block diagram of a mobile terminal, according to an exemplary embodiment.

FIG. 7 illustrates a block diagram of the above-described mobile terminal, referred to herein as a mobile terminal 700, according to an exemplary embodiment. Referring to FIG. 7, the mobile terminal 700 may include one or more of the following components: a processor 702 configured to execute program instructions to perform the above described misoperation-preventing methods, random access memory (RAM) 704 and read only memory (ROM) 706 configured to access and store information and program instructions, storage 708 to store data and information, databases 710 to store tables, lists, or other data structures, I/O devices 712 that includes a touch screen, interfaces 714, an antenna 716, etc.

In exemplary embodiments, there is also provided a non-transitory, non-volatile readable storage medium including instructions, executable by the processor 702 in the mobile terminal 700, for performing the above-described misoperation-preventing methods.

One of ordinary skill in the art would understand that the above-described methods may be realized through software, hardware, or a combination of software and hardware. The software may be stored in the non-volatile storage medium (e.g., a CD-ROM, a U disk, a mobile hard disk, etc.). The software may include certain commands for a piece of computer equipment (e.g., a PC, a server, or network equipment) to implement the above-described methods.

One of ordinary skill in the art would understand that the above-described modules may be distributed in the mobile terminal, or be located in one or more devices other than the mobile terminal. In addition, multiple ones of the above-described modules may be combined into one module, and any of the above-described modules may be further divided into multiple sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A misoperation-preventing method for use in a mobile terminal having a touch screen, comprising:
    monitoring a distance between the mobile terminal and an object in a surrounding environment, after the mobile terminal transitions from a standby state to an active state;
    determining if the distance satisfies a preset distance condition;
    disabling the touch screen if it is determined that the distance satisfies the preset distance condition, wherein the disabling includes causing the mobile terminal to transition into a screen-off state preset by an operating system of the mobile terminal, and to report a cause for transitioning into the screen-off state for the operating system to judge, on the basis of the cause for transitioning into the screen-off state, whether to implement a control command given by a user not through the touch screen;

enabling the touch screen if it is determined that the distance does not satisfy the preset distance condition;

determining whether the distance continues to not satisfy the preset distance condition for a preset time period; and stopping monitoring of the distance between the mobile terminal and the object in the surrounding environment, if it is determined that the distance continues to not satisfy the preset distance condition for the preset time period.

2. The method of claim 1, wherein the monitoring comprises:
monitoring the distance between the touch screen of the mobile terminal and a nearest object in front of the touch screen.

3. The method of claim 1 further comprising:
disabling the touch screen, if it is determined that the distance satisfies the preset distance condition before the end of the preset time period.

4. The method of claim 1, wherein the determining if the distance satisfies a preset distance condition comprises determining if the distance is smaller than, or equal to, a preset distance threshold.

5. A non-transitory medium including instructions, executable by a processor in a mobile terminal, for performing a misoperation-preventing method, the method comprising:
monitoring a distance between the mobile terminal and an object in a surrounding environment, after the mobile terminal transitions from a standby state to an active state;

determining if the distance satisfies a preset distance condition;

disabling the touch screen if it is determined that the distance satisfies the preset distance condition, wherein the disabling includes causing the mobile terminal to transition into a screen-off state preset by an operating system of the mobile terminal, and to report a cause for transitioning into the screen-off state for the operating system to judge, on the basis of the cause for transitioning into the screen-off state, whether to implement a control command given by the user not through the touch screen;

enabling the touch screen if it is determined that the distance does not satisfy the preset distance condition;

determining whether the distance continues to not satisfy the preset distance condition for a preset time period; and stopping monitoring of the distance between the mobile terminal and the object in the surrounding environment, if it is determined that the distance continues to not satisfy the preset distance condition for the preset time period.

6. The non-transitory medium of claim 5, wherein the monitoring comprises:
monitoring the distance between the touch screen of the mobile terminal and a nearest object in front of the touch screen.

7. The non-transitory medium of claim 5, the method further comprising:
disabling the touch screen, if it is determined that the distance satisfies the preset distance condition before the end of the preset time period.

8. The non-transitory medium of claim 5, wherein the determining if the distance satisfies a preset distance condition comprises determining if the distance is smaller than, or equal to, a preset distance threshold.

9. A mobile terminal, comprising:
a processor; and
a touch screen coupled to the processor;
wherein the processor is configured to:
monitor a distance between the mobile terminal and an object in a surrounding environment, after the mobile terminal transitions from a standby state to an active state;

determine if the distance satisfies a preset distance condition;

disable the touch screen if the processor determines that the distance satisfies the preset distance condition, wherein the disabling includes causing the mobile terminal to transition into a screen-off state preset by an operating system of the mobile terminal, and to report a cause for transitioning into the screen-off state for the operating system to judge, on the basis of the cause for transitioning into the screen-off state, whether to implement a control command given by the user not through the touch screen;

enable the touch screen if it is determined that the distance does not satisfy the preset distance condition;

determine whether the distance continues to not satisfy the preset distance condition for a preset time period; and stop monitoring of the distance between the mobile terminal and the object in the surrounding environment, if it is determined that the distance continues to not satisfy the preset distance condition for the preset time period.

10. The mobile terminal of claim 9, wherein the processor is further configured to:
monitor the distance between the touch screen of the mobile terminal and a nearest object in front of the touch screen.

11. The mobile terminal of claim 9, the processor being further configured to:
disable the touch screen, if it is determined that the distance satisfies the preset distance condition before the end of the preset time period.

12. The mobile terminal of claim 9, wherein the processor is further configured to determine if the distance is smaller than, or equal to, a preset distance threshold.

* * * * *